US 6,617,998 B1

United States Patent
Cook et al.

(10) Patent No.: US 6,617,998 B1
(45) Date of Patent: Sep. 9, 2003

(54) SHORT PULSE AUTOMATIC RANGING ANTI-SHIP MISSILE FUZE

(75) Inventors: Richard D. Cook, Corona, CA (US); Bennie D. Macomber, Norco, CA (US); William F. Vizard, Riverside, CA (US); Eldridge A. Williamson, Huntington Beach, CA (US); Anthony Estrada, Corona, CA (US)

(73) Assignee: The United States of America as represented by the Secretary of the Navy, Washington, D.C.

( * ) Notice: Subject to any disclaimer, the term of this patent is extended or adjusted under 35 U.S.C. 154(b) by 0 days.

(21) Appl. No.: 05/069,516

(22) Filed: Aug. 6, 1970

(51) Int. Cl.[7] .................................................. G01S 7/40

(52) U.S. Cl. .............................. 342/68; 342/90; 342/97

(58) Field of Search .................. 343/7 PF, 12 MD; 102/70.2 P; 342/27, 28, 68, 90–95, 97, 99, 159, 160, 162

(56) References Cited

U.S. PATENT DOCUMENTS

| | | | | | |
|---|---|---|---|---|---|
| 3,492,632 | A | * | 1/1970 | Vilkomerson et al. | 343/7 PF |
| 3,567,163 | A | * | 3/1971 | Kepp et al. | 244/3.14 |
| 3,594,791 | A | * | 7/1971 | Pintell | 343/7 PF |
| 3,850,102 | A | * | 11/1974 | Morrow | 102/210 |
| 3,992,711 | A | * | 11/1976 | Stoakes | 342/193 |
| 4,309,946 | A | * | 1/1982 | Block | 102/213 |
| 6,166,680 | A | * | 12/2000 | Macomber | 342/62 |

* cited by examiner

Primary Examiner—John B. Sotomayor
(74) Attorney, Agent, or Firm—James A. Ward; Michael A. Kagan; Peter A. Lipovsky

(57) ABSTRACT

An active short pulse fuze system for arming on a true target acquisition and firing only on the loss of the acquired target signal. The sea surface is tracked by means of a sea tracking loop A target threshold is established and is coupled to the sea tracking loop so as to expand and contract with the sea tracking. A return signal will pass the target threshold only when there is an abrupt reduction in range, indicating the presence of a target. The presence of this signal will arm the firing circuit. An abrupt increase in range will indicate the loss of the target and cause immediate detonation of the warhead.

3 Claims, 6 Drawing Sheets

SHORT PULSE AUTOMATIC RANGING ANTI-SHIP MISSILE FUZE

This application relates to application, Ser. No. 69,517 for Automatic Range Reducing Target Detecting Device, filed Aug. 6, 1970 and Ser. No. 69,518 for Range Dependent Time Delay Target Detecting Device, filed, Aug. 6, 1970, both assigned to the same assignee.

STATEMENT OF GOVERNMENT INTEREST

The invention herein described may be manufactured and used by or for the Government of the United States of America for governmental purposes without the payment of any royalties thereon or therefor.

BACKGROUND OF THE INVENTION

The present invention relates to anti-ship missile proximity fuzing and more particularly to anti-ship missile proximity fuzing wherein improvements have been provided to prevent prefunctioning on either the surface of the sea or extraneous targets. There are no suitable proximity fuzes available or previously proposed for anti-ship application. Those fuzes which have been proposed or used for this purpose suffer from the defect of prefunctioning on the surface of the sea or the target and preclude the more effective contact detonation. This has led to the practice of using contact type fuzes only for anti-ship weapon application. The use of this type fuzing results in the omission of potential kills on high near-miss trajectories of the weapon.

SUMMARY

The present invention provides a fuzing system which will give optimum warhead burst control on near-miss trajectories and will not prefunction on either the surface of the sea or target for those trajectories that would ultimately collide with the target. The system can utilize either a pulsed microwave or optical system to provide the received signals and timing inputs to a logic circuit. The logic circuitry effectively produces a sea tracking gate in the antenna beam which illuminates the sea surface. Also produced in the antenna beam is a target gate which is shorter in range than the sea gate and is slaved to the sea gate. This allows the target gate to expand and contract with the sea tracking gate as the missile flies over the sea but is prevented from actually detecting the sea surface. The presence of a ship target in the antenna beam results in an abrupt signal appearing in the target gate which causes the target gate to hold at a fixed value independent of the sea tracking gate, and causes the firing circuit to arm.

Accordingly, an object off the invention is to provide an improved anti-ship missile fuze having automatic ranging.

Other objects and many of the attendant advantages of this invention will become readily appreciated as the same becomes better understood by reference to the following detailed description when considered in connection with the accompanying drawings wherein.

Figure 1:
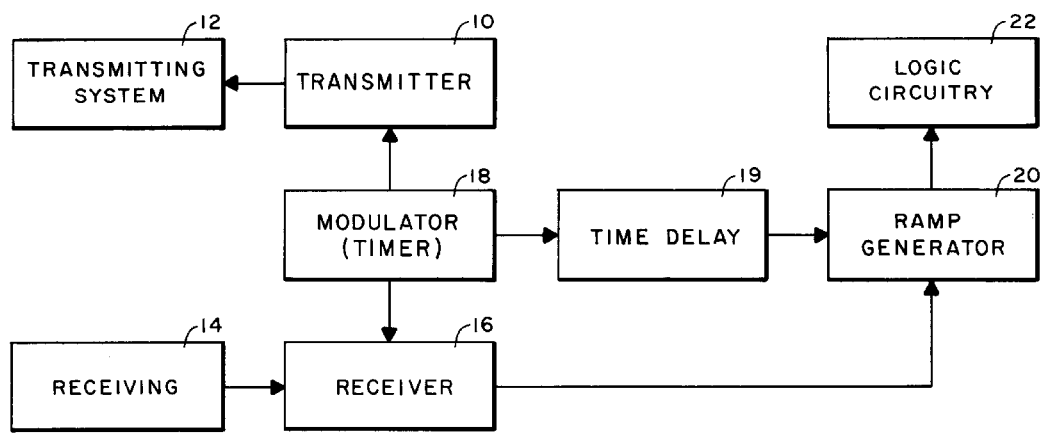
FIG. 1 is a simplified block diagram showing a fuze system embodying the invention.

Referring now to the drawings there is shown in FIG. 1 a typical target detecting system which includes a transmitter 10 for generating electromagnetic pulses which are transmitted by transmitting system 12 to illuminate a target (not shown). Reflected energy is received or sensed by receiving system 14 and fed to receiver 16 for detection. Modulator 18 provides the timing signals for synchronizing transmitter 10 and receiver 16. The detected output signal from receiver 16 provides the start signal for ramp generator 20. Modulator 18 also provides a timing pulse through a time delay circuit 19 to stop ramp generator 20 a predetermined time interval after a pulse is transmitted. Time delay circuit 19 should be adjusted to correspond to the arrival of return signals which are just out of the desired sea tracking range. The output voltage from ramp generator 20 is fed to logic circuitry 22 which generates a firing pulse in response to the detection and loss of a target signal.

Figure 2:
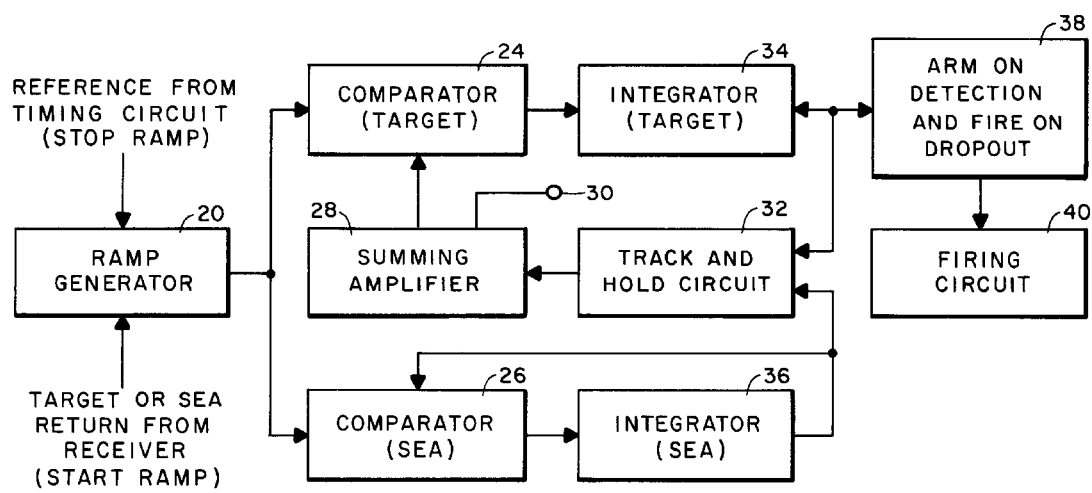
FIG. 2 is a block diagram of the logic circuitry of FIG. 1.

As shown in FIG. 2 the output of ramp generator 20 is fed to target comparator 24 and to sea comparator 26. In comparator 24, the ramp voltage is compared with a reference voltage from summing amplifier 28. The reference voltage out of summing amplifier 28 is dependent upon a bias voltage supplied at terminal 30 and the output signal from track and hold circuit 32. The output from track and hold circuit 32 will follow the output signal from sea integrator 36 until a command signal is received from target integrator 34. The output from sea integrator 36 provides a feedback reference for sea comparator 26 and is coupled through track and hold circuit 32 and summing amplifier 28 to provide the reference voltage for target comparator 24. The added bias voltage applied at terminal 30 is to provide target and sea gate separation. The arm on detection and fire on dropout circuit 38 is armed by the presence of an output signal from integrator 34, in response to the proper number of pulses received from comparator 24.

The arming signal also commands the track and hold circuit 32 into the hold mode causing the voltage supplied to the summation amplifier 28 to be fixed at the level existing at the time of arming. The reference voltage to comparator 24 is thus fixed at the level existing at the time of arming.

The loss of target signal will cause the output of integrator 34 to cease which will cause firing circuit 40 to activate.

Referring now to the schematic diagram of FIG. 3, ramp generator 20 is shown as a bistable multivibrator 42 coupled through a coupling network 44 to the base of transistor 46. Transistor 46 is connected in parallel with charging capacitor 47 in series with transistor 48 to a positive voltage source at terminal 50. Transistor 48 is biased by means of resistors 52, 54 and 56 to provide a constant current source. Capacitor 47 is connected in series with transistor 48 and when transistor 46 is non-conducting will be charged at a uniform rate.

The voltage on capacitor 47 is coupled by means of emitter follower 58 to the bases of transistors 60 and 62 of comparators 24 and 26, respectively. Comparators 24 and 26 are identical in circuitry and may be of the MC 1710 integrated circuit type.

When an output signal appears at the output of comparator 26, it is fed to sea integrator circuit 36 which includes a monostable multivibrator 64 to provide pulses suitable for pulse counting circuit 66. Capacitor 68 will be linearly charged with a voltage proportional to the number of pulses received per unit of time. The voltage stored on capacitor 68 is coupled by means of emitter follower 70 as a feedback reference voltage to transistor 72 of comparator 26 and as the input to operational amplifier 74. Operational amplifier 74 may be a CA 3015 integrated circuit and is used to provide a suitable drive voltage to track and hold circuit 32.

The output voltage from amplifier 74 is applied as the input signal to diode bridge gate 76 which is normally biased to conduct. When diode bridge 76 is conducting, the input signal is passed to charge capacitor 78 which is connected across the inverting input and output of operational amplifier 80 which may also be a CA 3015 integrated circuit. The output of operational amplifier 80 follows the voltage stored on capacitor 78 with a minimum amount of current drain. The output of operational amplifier 80 is fed as a stabilizing feedback voltage to operational amplifier 74 and to summation network 75. An adjustable bias voltage is also applied to summation network 75 by means of a negative voltage at terminal 77 and potentiometer 79. The resultant voltage is applied to the inverting input of operational amplifier 81. The output of operational amplifier 81 which may also be a CA 3015 integrated circuit is connected to the base of transistor 61 and provides the reference voltage for comparator 24.

Figure 3A:
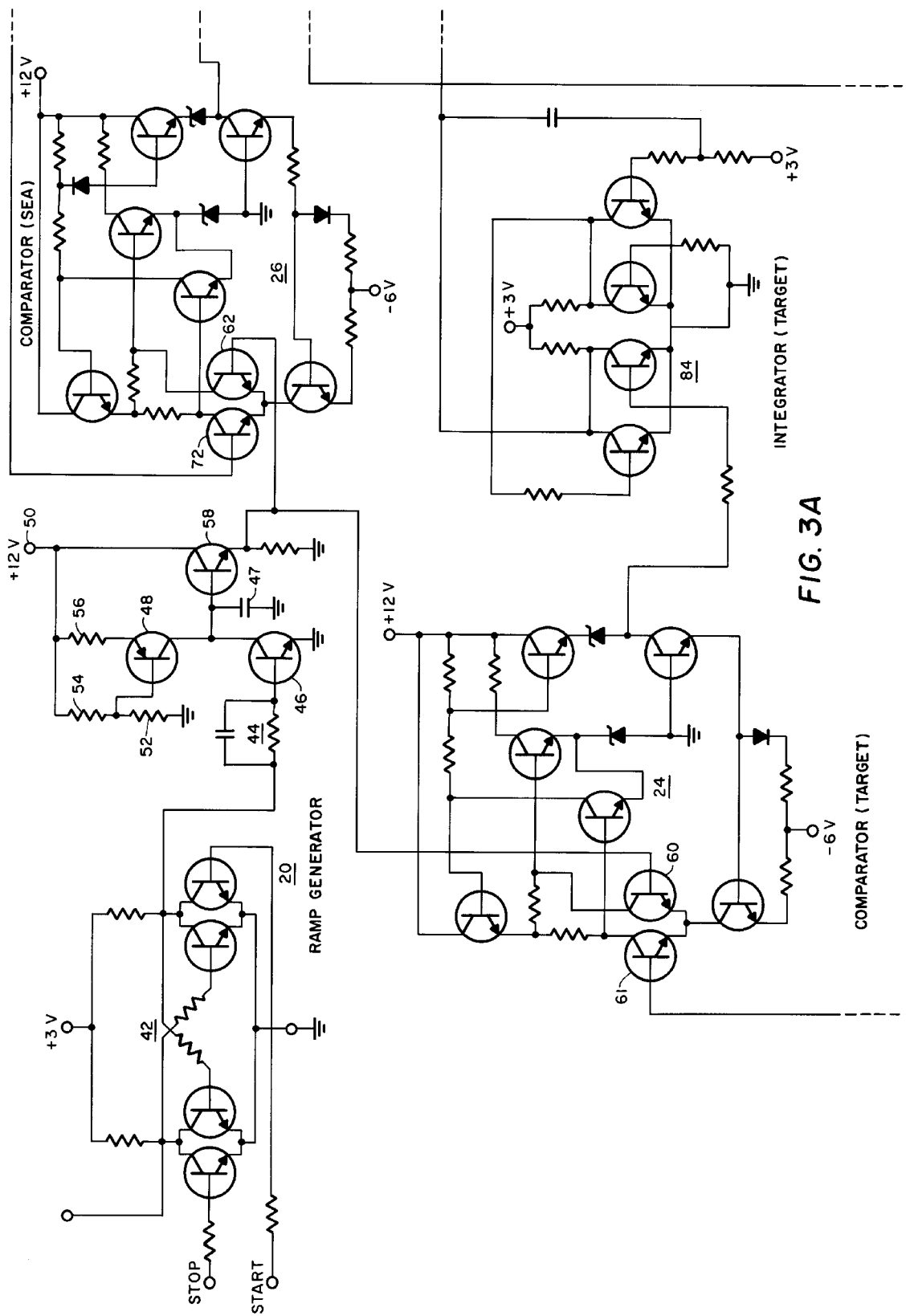
FIGS. 3A–3D is a schematic diagram of the preferred embodiment of the invention.
Figure 3B:
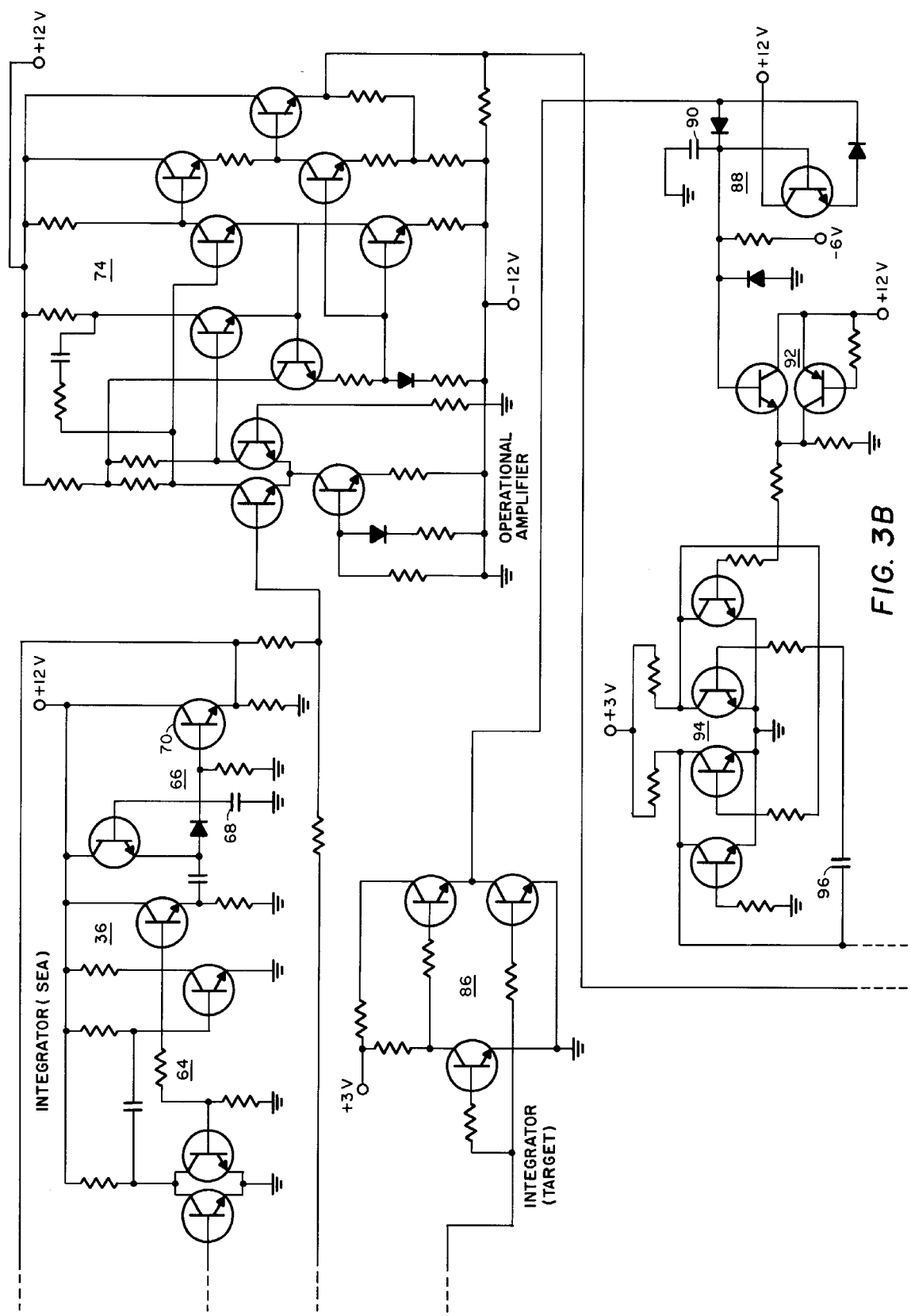
Figure 3C:
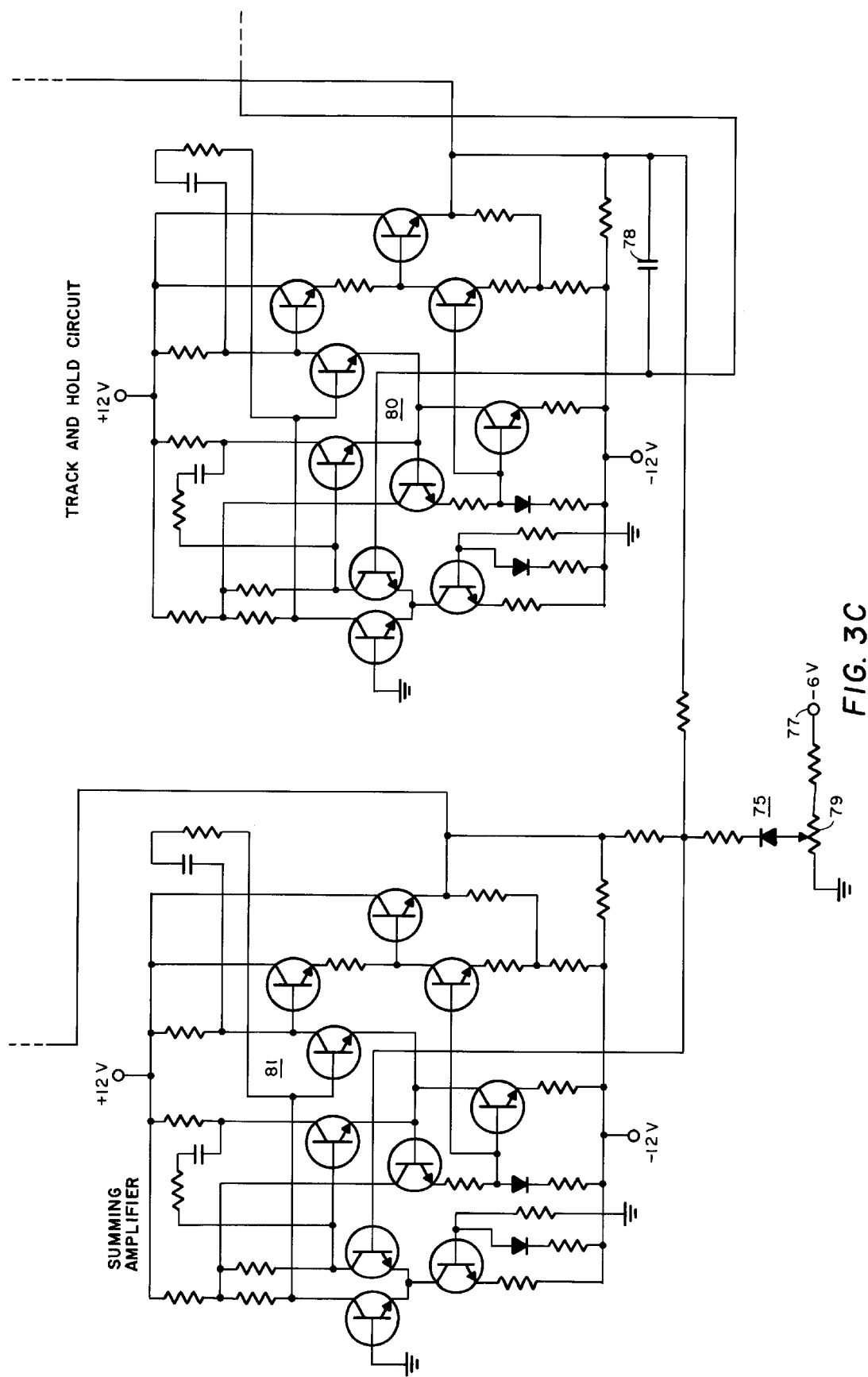
Figure 3D:
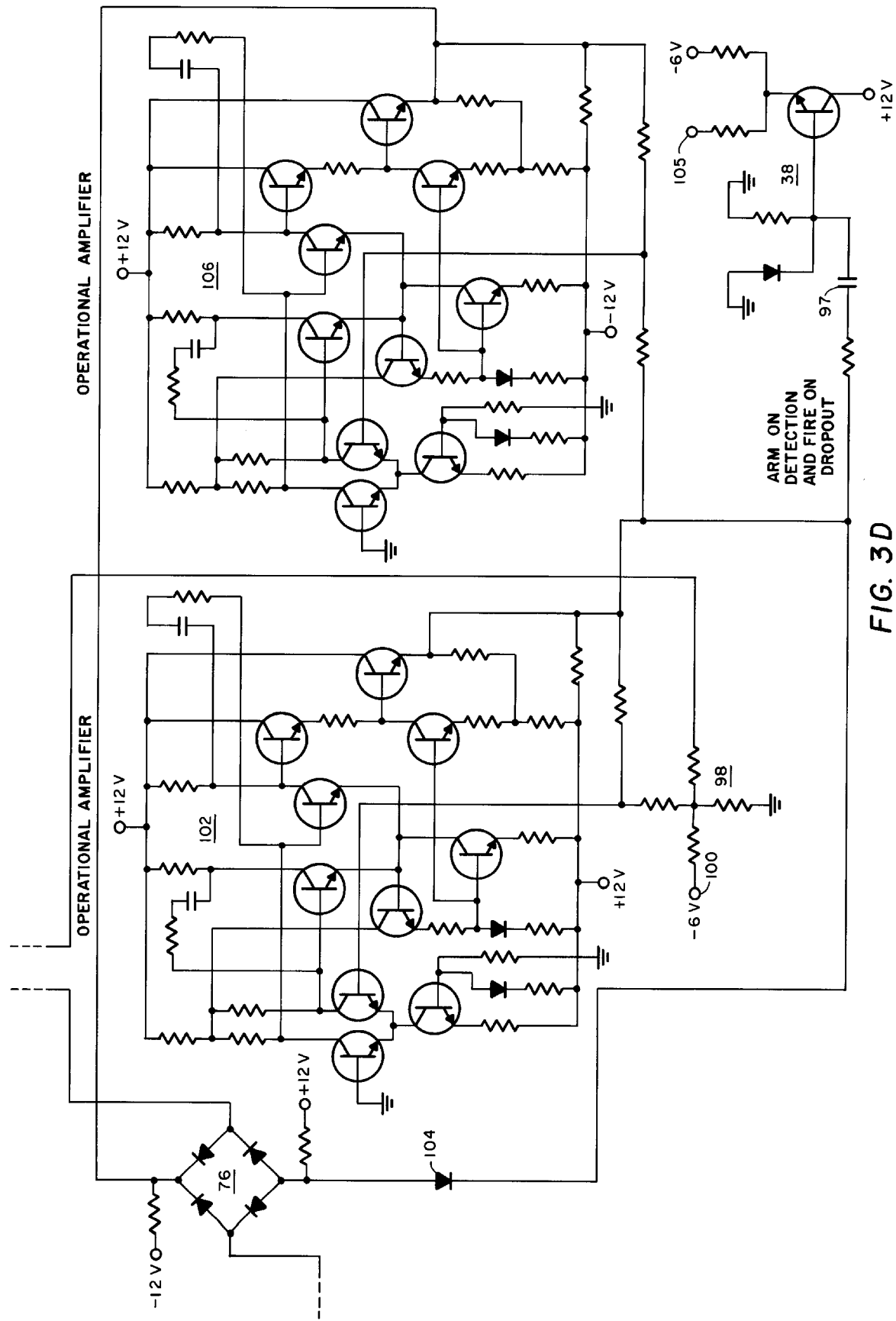

When an output signal exists at the output of comparator 24, it is fed to target integrator which includes monostable multivibrator 84, buffer circuit 86 and pulse counting circuit 88. Monostable multivibrator 84 may be an integrated circuit MC 914 and buffer 86 may be an integrated circuit MC 900. Capacitor 90 of pulse counting circuit 88 will be linearly charged with a voltage proportional to the number of pulses received per unit of time. The voltage stored on capacitor 90 is coupled by means of dual emitter follower 92 to bistable multivibrator 94 which may be an integrated circuit MC 914. Capacitor 96 is external to insure that an output signal will persist for a predetermined minimum time. This prevents false target dropouts during initial target acquisition. The positive voltage on capacitor 96 (FIG. 3) is connected to summing network 98 (FIG. 3D). A constant negative voltage is applied to terminal 100 and the combined input voltages will result in a positive voltage which is applied to the inverting input of operational amplifier 102. Operational amplifier 102 may also be a CA 3015 integrated circuit. The output of amplifier 102 is fed through diode 104 as one of the controlling bias voltages of diode bridge 76 and is also fed to the inverting input of operational amplifier 106 whose output provides the other controlling bias voltage to diode bridge 76. Operational amplifier 106 may also be of the GA 3015 integrated circuit type. The output of amplifier 102 is also fed to arm on detection and fire on dropout circuit 38.

Figure 5:
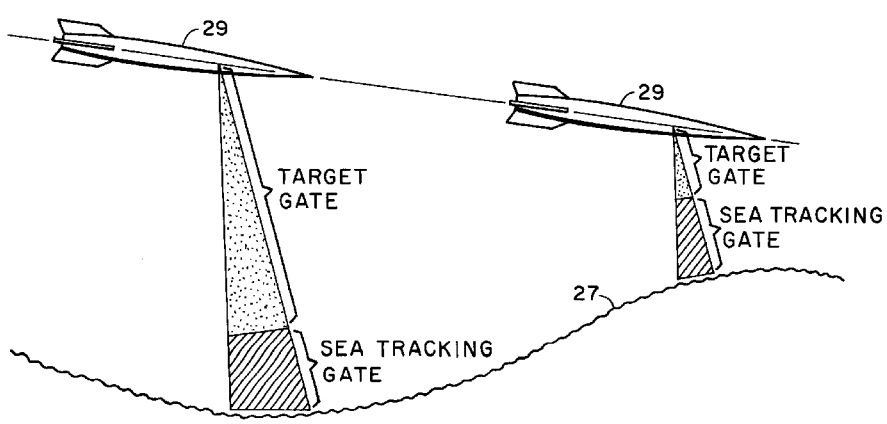
FIGS. 4 and 5 are diagrams used in describing the operation of the invention.
Figure 4A:
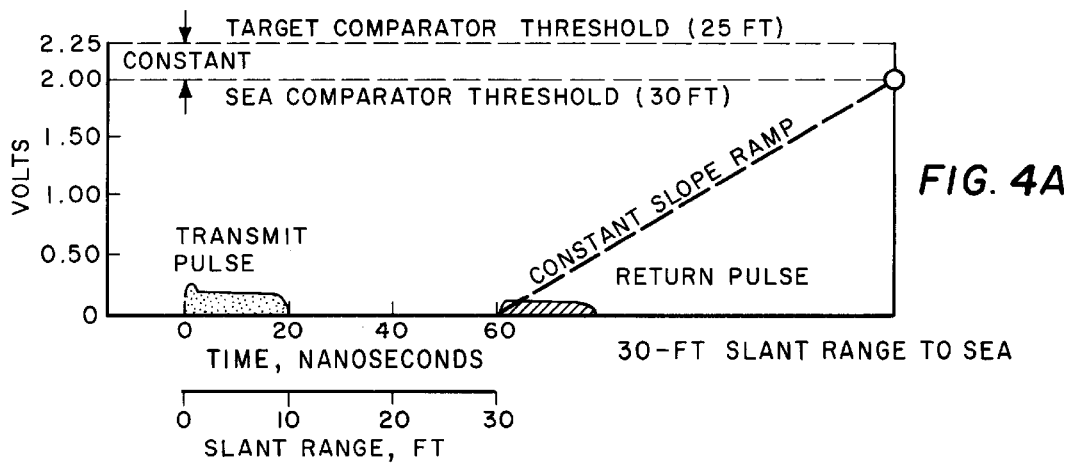
Figure 4B:
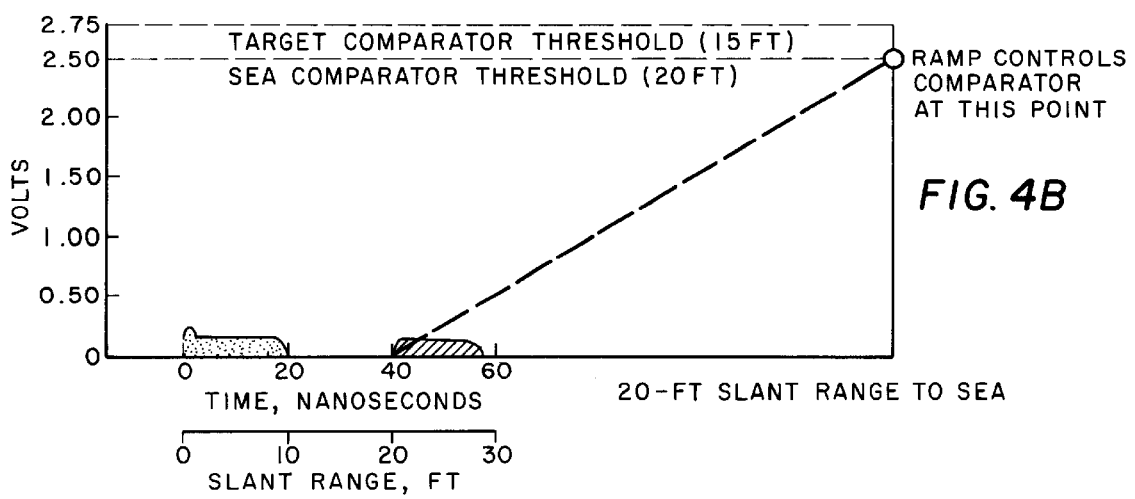
Figure 4C:
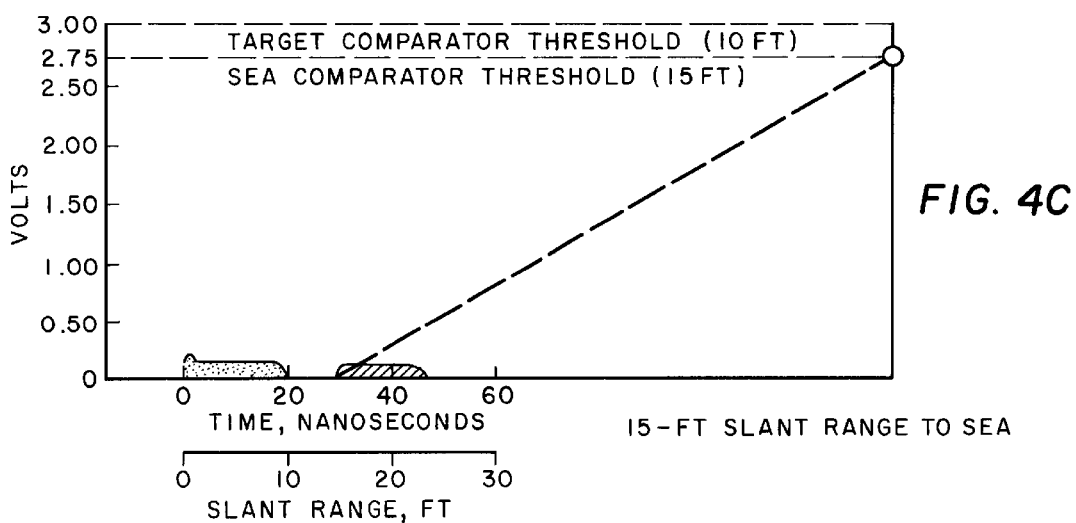

In operation, return signals received from the sea surface which are within range turn on ramp generator 20 which is turned off after a predetermined time delay controlled by time delay 19. The amplitudes of the resultant ramps are of sufficient amplitude to cause an output from sea comparator 26. The integrated output from integrator 36 is fed back as a reference voltage to comparator 26 and establishes the sea comparator threshold (see FIG. 4). The target comparator threshold is established by the summation of the sea comparator threshold and the bias voltage applied at terminal 77 (FIG. 3C). Target and sea comparator threshold levels are maintained at a constant differential as the slant range to the sea changes (FIG. 4). As seen in FIG. 4, the ramp amplitude is less than the target comparator threshold as long as only sea return is detected. As suggested in FIG. 5, slow moving variations in the slant range between the sea surface 27 and missile 29 cause adjustments in the sea tracking and target gates which correspond to the varying magnitudes in the sea and target comparator thresholds shown in FIG. 4. This is accomplished by choosing a value for capacitor 68 so that the integration time constant will be long enough to allow the tracking of the slow variations of the sea surface and the missile angle of attack. The value for capacitor 90 should be chosen so as to provide an integration time constant that is short compared to that of sea integrator 36. This permits the system to distinguish between sea return and true target return signals.

The presence of a target at a shorter slant range than that to the sea results in an abruptly increased ramp amplitude, if the ramp voltage amplitude exceeds the reference voltage of comparator 24. This is possible since the reference voltage for comparator 24 is derived from sea integrator 36 which cannot follow abrupt changes due to its long time constant. If the ramp amplitude exceeds the target comparator threshold for a duration resulting in an output from integrator 34, target detection has occurred. Detection causes track and hold circuit 32 to hold the target threshold voltage (voltage across capacitor 78, FIG. 3C) at the value existing at the time of detection. The detection of the target causes capacitor 97 to be charged to the level of the output voltage from amplifier 102.

Since the threshold voltage to the target comparator is held constant while the target is in range, only a marked increase in slant range (loss of target) will cause the output of the target integrator to decrease. This decrease will cause a reversal in the output voltage of amplifier 102. This voltage will be added to the voltage on capacitor 97 causing a firing signal to appear at terminal 105.

What is claimed is:
1. In an automatic ranging anti-ship missile fuze system the combination comprising:

(a) transmitting and receiving means for transmitting short pulse energy and receiving reflections of said transmitted short pulse energy, (b) ramp function generating means coupled to said transmitting and receiving means and being responsive to received reflected signals to start generating a ramp function voltage and being responsive to a delayed timing pulse to stop generating said ramp function voltage, (c) first comparator circuit means coupled to said ramp function generating means for comparing said ramp function voltage to a first reference voltage and generating an output voltage proportional to the amplitude that said ramp function voltage exceeds said first reference voltage, (d) second comparator circuit means coupled to said ramp function generating means for comparing said ramp function voltage to a second reference voltage and generating an output voltage when said ramp function voltage exceeds said second reference voltage, (e) a first integrator coupled to the output of said first comparator circuit means for generating an output voltage proportional to the number of pulses received within a unit of time, (f) a second pulse integrator coupled to the output of said second comparator circuit means for generating an output voltage when a predetermined number of pulses have been received from said second comparator circuit means within a predetermined unit of time, (g) first feedback circuit means coupled between the output of said first integrator and said first comparator circuit for providing said first reference voltage, (h) second feedback circuit means coupled between the output of said first integrator and said second comparator circuit for providing said second reference voltage, (i) said second feedback circuit means also being coupled to the output of said second integrator and being responsive to an output signal therefrom to maintain said first and second reference voltages constant at the same value as when said output signal first occurred from said second integrator, (j) and firing circuit means coupled to said second integrator and being responsive to the presence of an output from said second integrator to arm and being responsive to the loss of an output signal from said second integrator to generate a firing signal.

2. The system of claim 1 wherein said first integrator has a relatively long time constant.

3. The system of claim 1 wherein said second integrator has a relatively short time constant.

* * * * *